United States Patent
Robison et al.

(10) Patent No.: US 10,986,781 B1
(45) Date of Patent: Apr. 27, 2021

(54) AUGER ATTACHMENT SETS FOR HEADERS OF WORK MACHINES

(71) Applicant: Deere & Company, Moline, IL (US)

(72) Inventors: Jeremy P. Robison, Ankeny, IA (US); Jeffrey S. Wigdahl, Ames, IA (US); Jordan J. Ruby, Ankeny, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 16/593,494

(22) Filed: Oct. 4, 2019

(51) Int. Cl.
*A01D 61/00* (2006.01)
*B65G 65/22* (2006.01)

(52) U.S. Cl.
CPC .......... *A01D 61/008* (2013.01); *B65G 65/22* (2013.01)

(58) Field of Classification Search
None
See application file for complete search history.

(56) References Cited

U.S. PATENT DOCUMENTS

| | | | |
|---|---|---|---|
| 1,771,163 A | 7/1930 | Crites | |
| 3,603,008 A | 9/1971 | Heth et al. | |
| 4,271,956 A * | 6/1981 | Hutchinson | B65G 65/22 198/613 |
| 5,620,083 A * | 4/1997 | Vogelgesang | A01D 61/008 198/613 |
| 5,980,383 A | 11/1999 | Medley | |
| 6,158,571 A * | 12/2000 | Gosa | A01D 61/008 198/613 |
| 6,272,821 B1 | 8/2001 | Wigdahl | |
| 7,621,113 B2 | 11/2009 | Blakeslee et al. | |
| 8,621,835 B2 * | 1/2014 | Bollig | A01D 45/021 56/119 |
| 8,693,922 B2 | 4/2014 | Bucks et al. | |
| 2007/0204591 A1 * | 9/2007 | Reitzel | A01D 61/004 56/400 |

FOREIGN PATENT DOCUMENTS

| | | |
|---|---|---|
| GB | 2092086 A | 8/1982 |
| JP | 2014005110 A | 1/2014 |

OTHER PUBLICATIONS https://www.fastline.com/augers-tubes-accessories/part-detail/auger-tube-accessory-sn-amah123929-for-john-deere/9086d648-4a20-4744-81bc-f72e0a50697e.

* cited by examiner

Primary Examiner — Kavel Singh
(74) Attorney, Agent, or Firm — Taft Stettinius & Hollister LLP; Stephen F. Rost

(57) ABSTRACT

Machines and headers for machines are disclosed herein. A machine includes a chassis and a header coupled to the chassis. The header is positioned to remove crop material from the ground. The header includes an auger structured to interact with crop material passed through the header in use of the machine. The auger has a drum configured for rotation about a drum axis and at least one auger attachment set coupled to the drum.

18 Claims, 7 Drawing Sheets

AUGER ATTACHMENT SETS FOR HEADERS OF WORK MACHINES

FIELD OF THE DISCLOSURE

The present disclosure relates, generally, to a header for a work machine such as a construction or harvesting machine, and, more specifically, to a header for a cotton harvester.

BACKGROUND

Cotton harvesters typically include harvesting heads or headers configured to remove crop material (e.g., cotton) from the ground and convey the removed crop material for further downstream processing. As crop material is passed through a header, crop material may accumulate in clumps and cause, or otherwise be associated with, downstream blockages or obstructions that reduce performance. Accordingly, devices to reduce accumulation of crop material in a harvester and thereby improve harvester performance remain an area of interest.

SUMMARY

The present disclosure may comprise one or more of the following features and combinations thereof.

According to one aspect of the present disclosure, a machine may include a chassis and a header coupled to the chassis. The header may be positioned to remove crop material from the ground, and the header may include an auger structured to interact with crop material passed through the header in use of the machine. The auger may have a drum configured for rotation about a drum axis and at least one auger attachment set coupled to the drum. The at least one auger attachment set may include paddles that extend outwardly away from the drum and are structured to interact with crop material passed through the header to at least partially facilitate a uniform flow of crop material through the auger in use of the machine.

In some embodiments, the at least one auger attachment set may include a pair of shell halves that cooperatively extend over the drum, each of the pair of shell halves may extend about 180 degrees around the drum axis, and the at least one auger attachment set may include clamps to secure the pair of shell halves to one another around the drum axis. The clamps may include a first pair of clamps circumferentially spaced from one another about 180 degrees around the drum axis and a second pair of clamps circumferentially spaced from one another about 180 degrees around the drum axis.

In some embodiments, the at least one auger attachment set may include flighting that extends outwardly away from the drum and is structured to interact with crop material passed through the header to, in cooperation with the paddles, facilitate a uniform flow of crop material through the auger in use of the machine. The fighting may contact the paddles coupled to the drum. The paddles coupled to the drum may include a first pair of paddles arranged in close proximity to one another and a second pair of paddles arranged in close proximity to one another, and the first and second pairs of paddles may be circumferentially spaced from one another about the drum axis. Additionally, in some embodiments, each of the paddles may include a flange portion that contacts at least one flight of the flighting and is positionable relative to the at least one flight to adjust a pitch of each paddle. Each of the paddles may include a bridge portion that interconnects the flange portion to a body portion of each paddle, and the bridge portion and the body portion may cooperate to define a generally V-shaped profile of each paddle. The body portion of each paddle may include a first end arranged adjacent the bridge portion and spaced from the at least one flight and a second end arranged opposite the first end and positioned in close proximity to the at least one flight.

In some embodiments, multiple paddles coupled to the drum may each include a block projection, a plate coupled to the block projection that extends partway around the drum axis, and a flap coupled to the plate. The plate of one paddle may contact the block projection of another circumferentially adjacent paddle, and the flap of the one paddle may extend toward the block projection of the another circumferentially adjacent paddle.

According to another aspect of the present disclosure, a header for a machine may include an auger and at least one auger attachment set. The auger may be structured to interact with crop material removed from the ground and passed through the header in use thereof, and the auger may have a drum configured for rotation about a drum axis. The at least one auger attachment set may be coupled to the drum. The at least one auger attachment set may include paddles coupled to the drum that extend outwardly away therefrom and spiraled flighting in contact with the paddles that extends outwardly away from the drum. The paddles and the spiraled fighting may be structured to interact with crop material passed through the header to facilitate a uniform flow of crop material through the auger in use of the header.

In some embodiments, the paddles may include a first pair of paddles coupled to the flighting in close proximity to one another and a second pair of paddles coupled to the fighting in close proximity to one another, and the first and second pairs of paddles may be circumferentially spaced from one another about the drum axis. The spiraled fighting may include a first flight coupled to the first and second pairs of paddles and a second flight coupled to a third pair of paddles arranged in close proximity to one another and to a fourth pair of paddles arranged in close proximity to one another, and the first and second flights may interface with one another to form a substantially continuous spiraled fighting segment.

In some embodiments, each of the paddles may include a flange portion that contacts at least one flight of the spiraled flighting, a body portion that extends toward and confronts the at least one flight, and a bridge portion that interconnects the flange portion to the body portion. The bridge portion and the body portion of each paddle may cooperate to define a generally V-shaped profile of each paddle.

According to yet another aspect of the present disclosure, a header for a machine may include an auger and at least one auger attachment set. The auger may be structured to interact with crop material removed from the ground and passed through the header in use thereof, and the auger may have a drum configured for rotation about a drum axis. The at least one auger attachment set may be coupled to the drum. The at least one auger attachment set may include paddles coupled to the drum that extend outwardly away therefrom and are structured to interact with crop material passed through the header to at least partially facilitate a uniform flow of crop material through the auger in use of the header.

In some embodiments, the at least one auger attachment set may include at least four paddles coupled to the drum, and multiple paddles may each include a block projection, a plate coupled to the block projection that extends partway around the drum axis, and a flap coupled to the plate. Additionally, in some embodiments, the at least one auger attachment set may include fighting that extends outwardly away from the drum and is structured to interact with crop material passed through the header to, in cooperation with the paddles, facilitate a uniform flow of crop material through the auger in use of the machine, the paddles may include at least one pair of paddles that are coupled to the fighting in close proximity to one another, and the at least one pair of paddles may cooperate to define a generally V-shaped profile of the at least one pair of paddles. Further, in some embodiments still, the at least one auger attachment set may include flighting that extends outwardly away from the drum and is structured to interact with crop material passed through the header to, in cooperation with the paddles, facilitate a uniform flow of crop material through the auger in use of the machine, each of the paddles may include a flange portion that contacts at least one flight of the flighting, a body portion that extends toward and confronts the at least one flight, and a bridge portion that interconnects the flange portion to the body portion, and the bridge portion and the body portion of each paddle may cooperate to define a generally V-shaped profile of each paddle.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
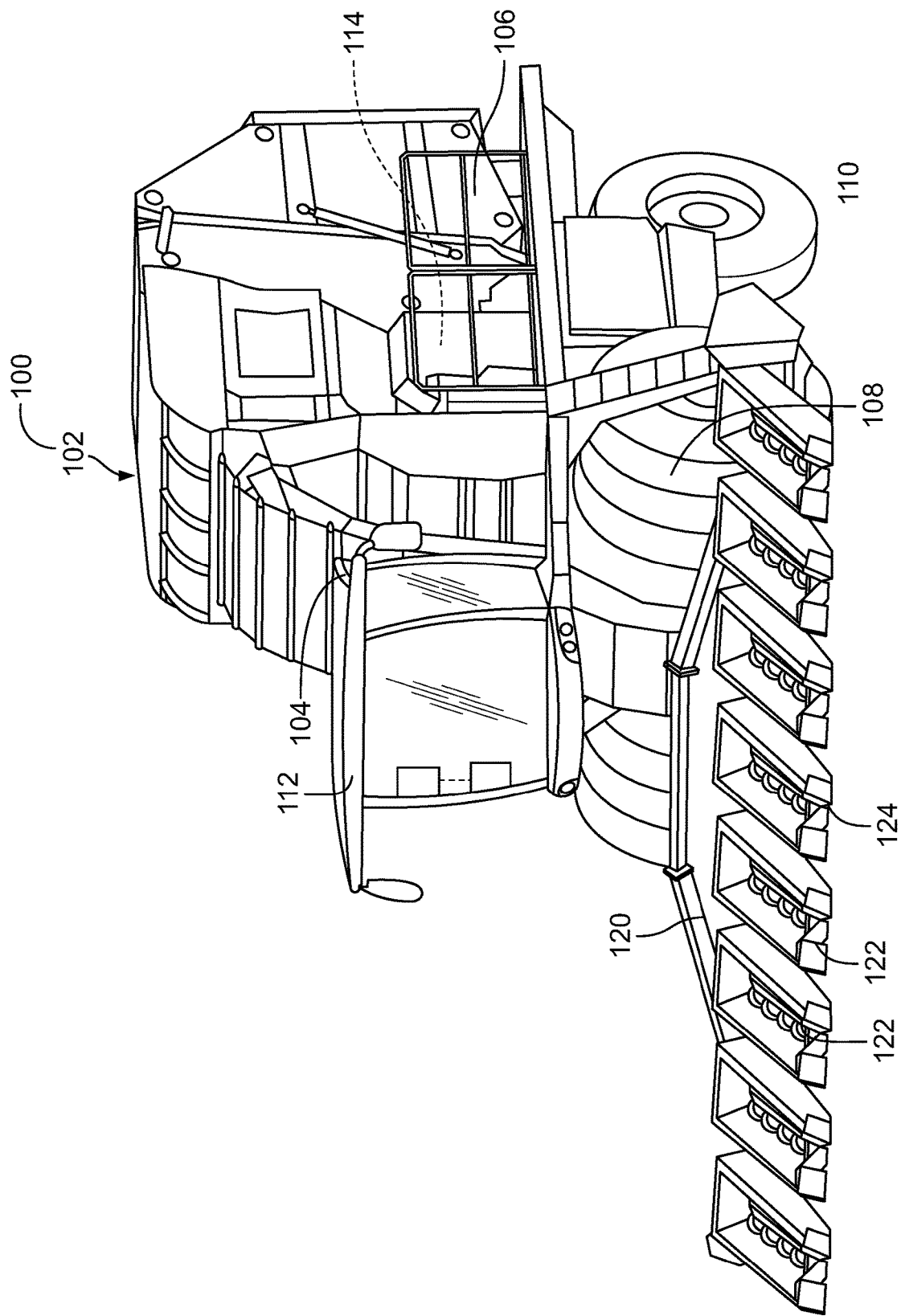
FIG. 1 is a front perspective view of a cotton harvester.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Referring now to FIG. 1, a work machine 100 is illustratively embodied as, or otherwise includes, an agricultural harvester 102. In the illustrative embodiment, the agricultural harvester 102 is embodied as, or otherwise includes, a cotton harvester such as a cotton picker, a cotton stripper, or a cotton module handler, for example. As such, in some embodiments, the harvester 102 may be embodied as a CP690 Cotton Picker, a CS690 Cotton Stripper, or a CM11 Cotton Module Handler, each of which is manufactured by John Deere. Of course, in other embodiments, it should be appreciated that the harvester 102 may be embodied as another suitable cotton picker, cotton stripper, or cotton module handler.

In other embodiments, however, it should be appreciated that the work machine 100 may be embodied as, or otherwise include, equipment used in one or more of a variety of applications. In one example, the machine 100 may be included in, or otherwise adapted for use with, equipment used in lawn and garden, construction, landscaping and ground care, golf and sports turf, forestry, engine and drivetrain, or government and military applications. In such embodiments, the machine 100 of the present disclosure may be included in, or otherwise adapted for use with, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, or marine engines, among other suitable equipment.

The illustrative harvester 102 includes a front chassis or front frame 104 and a rear chassis or rear frame 106 arranged opposite the front chassis 104 and coupled thereto. The front and rear chassis 104, 106 may include, or otherwise be embodied as, portions of a main frame or main chassis of the harvester 102. The front chassis 104 is supported on front wheels 108 and the rear chassis 106 is supported on rear wheels 110. The front chassis 104 supports an operator cab 112 in which various operational controls for the harvester 102 are provided.

In the illustrative embodiment, a drive unit or engine 114 mounted to the rear chassis 106 supplies driving power to all driven components of the harvester 102. The drive unit 114 is embodied as, or otherwise includes, any device capable of supplying rotational power to driven components of the harvester 102 to drive those components. In some embodiments, rotational power supplied by the drive unit 114 may be provided to the driven components of the harvester 102 by one or more transmission(s). In one example, the drive unit 114 may be configured to supply power to a transmission that is coupled to the rear wheels 110 and operable to provide various predetermined speed ratios selectable by an operator in either reverse or forward operating modes. In another example, the drive unit 114 may be configured to supply power to a transmission that is coupled to the front wheels 108, such as hydrostatic front-wheel-assist transmission, for example. Additionally, in some embodiments, the drive unit 114 may be coupled to a pump or generator to provide hydraulic, pneumatic, or electrical power to one or more components of the harvester 102, as the case may be.

The illustrative harvester 102 includes a header 120 coupled to and supported by the front chassis 104. The header 120 may be embodied as, or otherwise include, a harvesting head, structure, or work implement assembly positioned in proximity to the ground to remove crop material from the ground. In the illustrative embodiment, the header 120 is positioned to remove cotton from the ground (e.g., in a field). Of course, in other embodiments, it should be appreciated that the header 120 may be positioned to remove wheat, corn, or another suitable crop material from the ground. In any case, the header 120 includes cutter assemblies 122 arranged adjacent to one another along a forward edge 124 of the header 120. The cutter assemblies 122 each include one or more knives, rotary cutters, or other suitable cutting devices configured to cut or sever crop material from the ground so that the cut or severed crop material falls into the header 120.

The header 120 illustratively includes an auger 330 (see FIG. 3) that is supported in a rear housing 322 of the header 120 arranged opposite the forward edge 124 thereof. The auger 330 is structured to interact with cut crop material passed through the header 120 in use of the harvester 102. It should be appreciated that the illustrative header 120 may include one or more structures adapted to convey cut crop material toward the auger 330. For example, in some embodiments, the header 120 may include one or more conveyors (not shown) adapted to convey cut crop material centrally toward the auger 330 in use of the header 120.

Figure 2:
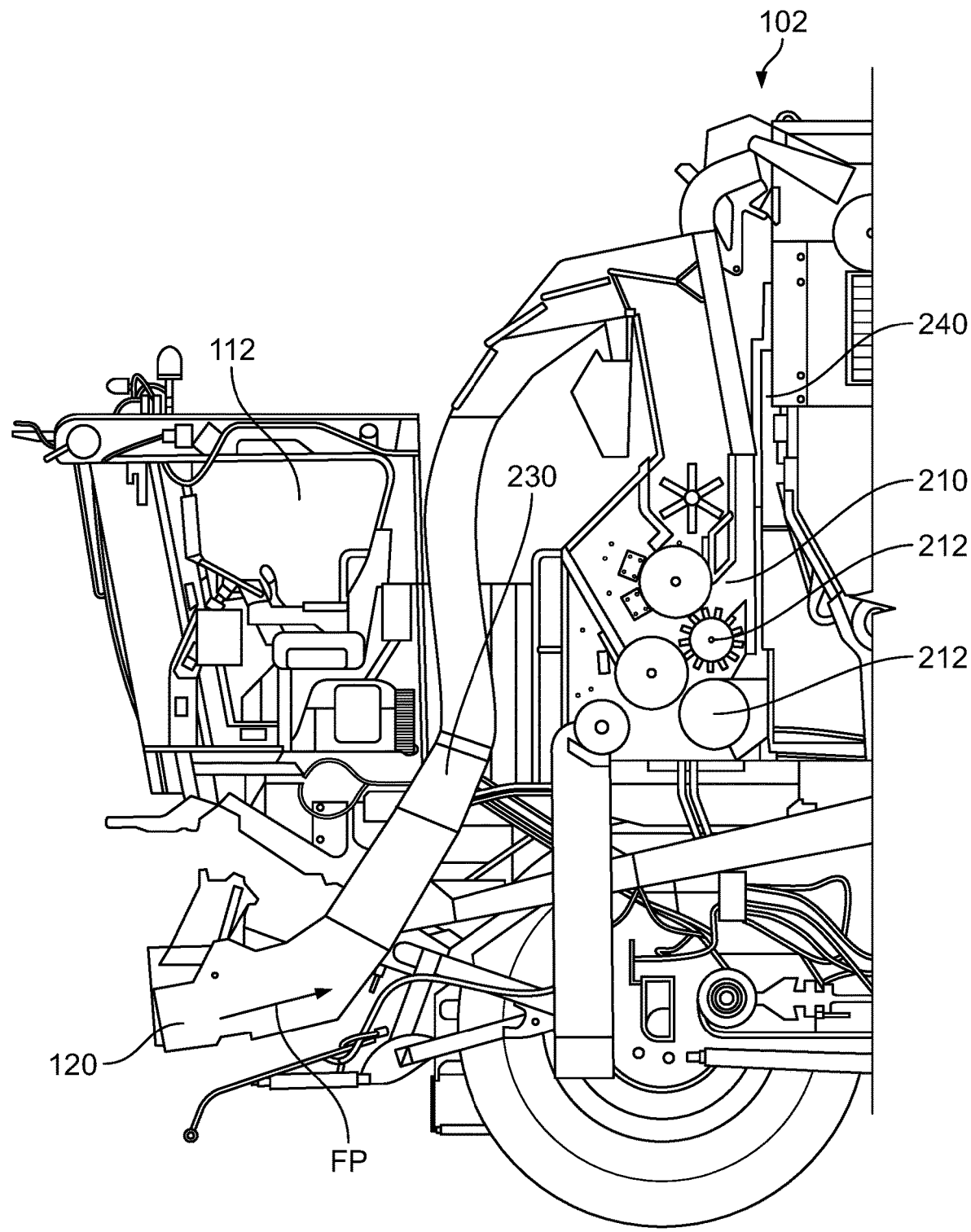
FIG. 2 is a partial sectional view of the cotton harvester of FIG. 1 taken about line 2-2.

Referring now to FIG. 2, the header 120 is coupled to, and positioned forward of, a cleaner 210 included in the harvester 102. The cleaner 210 is configured to clean and/or refine crop material passed through the header 120 during one or more downstream processing stages in use of the harvester 102. In some embodiments, the cleaner 210 may be coupled to, or otherwise included in, a feeder house 240 of the harvester 102. The header 120 and the cleaner 210 are fluidly coupled to one another by a duct 230. The duct 230 is adapted to conduct crop material passed through the header 120 to the cleaner 210. In the illustrative embodiment, the cleaner 210 includes rollers 212 cooperatively configured to process crop material provided by the header 120 through the duct 230 and thereby remove impurities (e.g., debris, foreign or otherwise undesirable substances, residue, dirt, etc.) and/or reduce accumulation (e.g., in clumps) to facilitate a uniform flow of crop material. Crop material processed by the cleaner 210 may be passed to one or more processing stages downstream of the cleaner 210 in use of the harvester 102.

Figure 3:
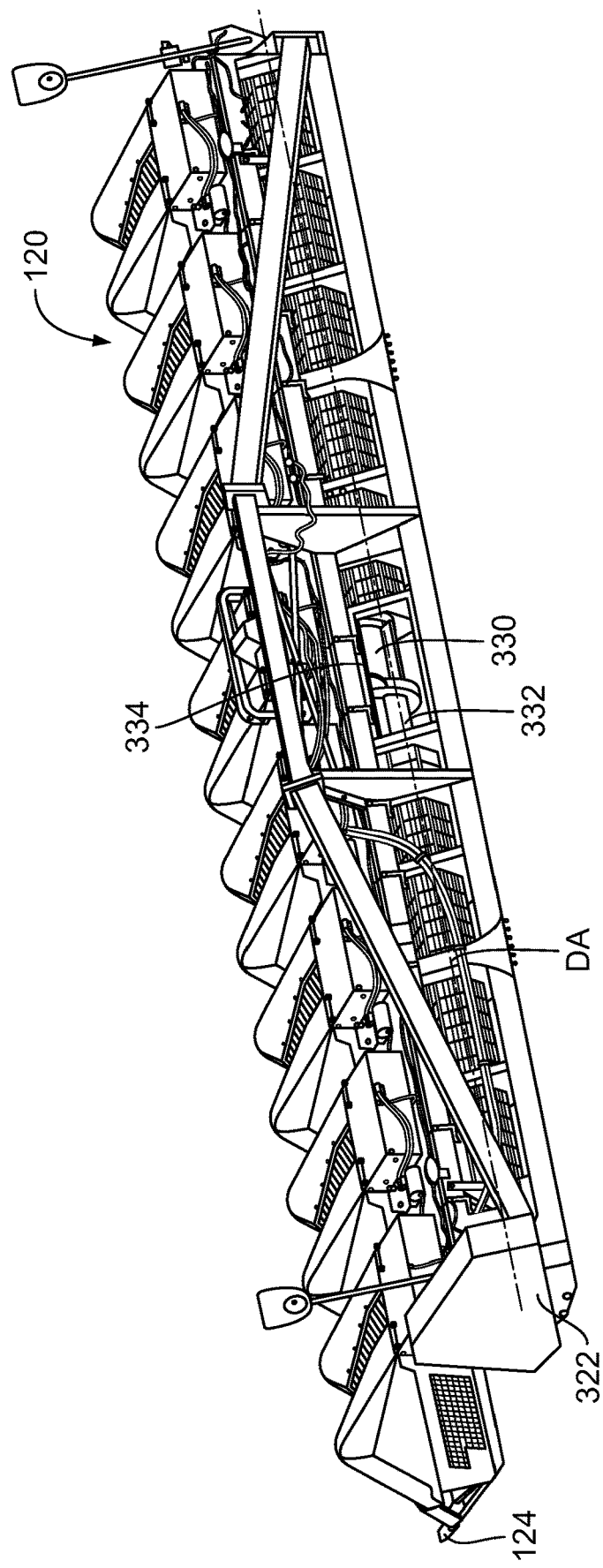
FIG. 3 is a rear perspective view of a header of the cotton harvester of FIG. 1.

Referring now to FIG. 3, the auger 330 is supported for movement in the rear housing 322 of the header 120. More specifically, a drum 332 of the auger 330 is supported and configured for rotation in the rear housing 322 about a drum axis DA. In use of the header 120, the drum 332 rotates about the drum axis DA and interacts with cut crop material to direct flow of the crop material through a discharge opening 334 toward the cleaner 210.

As will be apparent from the discussion that follows, when coupled with one or more auger attachment sets 430, 630, 830 (see FIGS. 4, 6, and 8) as envisioned by the present disclosure, the drum 332 and the one or more auger attachment sets 430, 630, 830 cooperate to direct flow of the crop material along a desired flow path FP toward the cleaner 210 in use of the header 102. It should be appreciated that the desired flow path FP may allow, or otherwise be associated with, a uniform flow of crop material that reduces blockages or obstructions downstream of the header 120 and thereby improves performance of the harvester 102. When crop material passed through the auger 330 flows outside of, or otherwise departs from, the desired flow path FP in use of the harvester 102, undesirable accumulation of crop material in clumps may result, which may lead to blockages and/or excessive loading of downstream devices such as the cleaner 210, for example.

Figure 4:
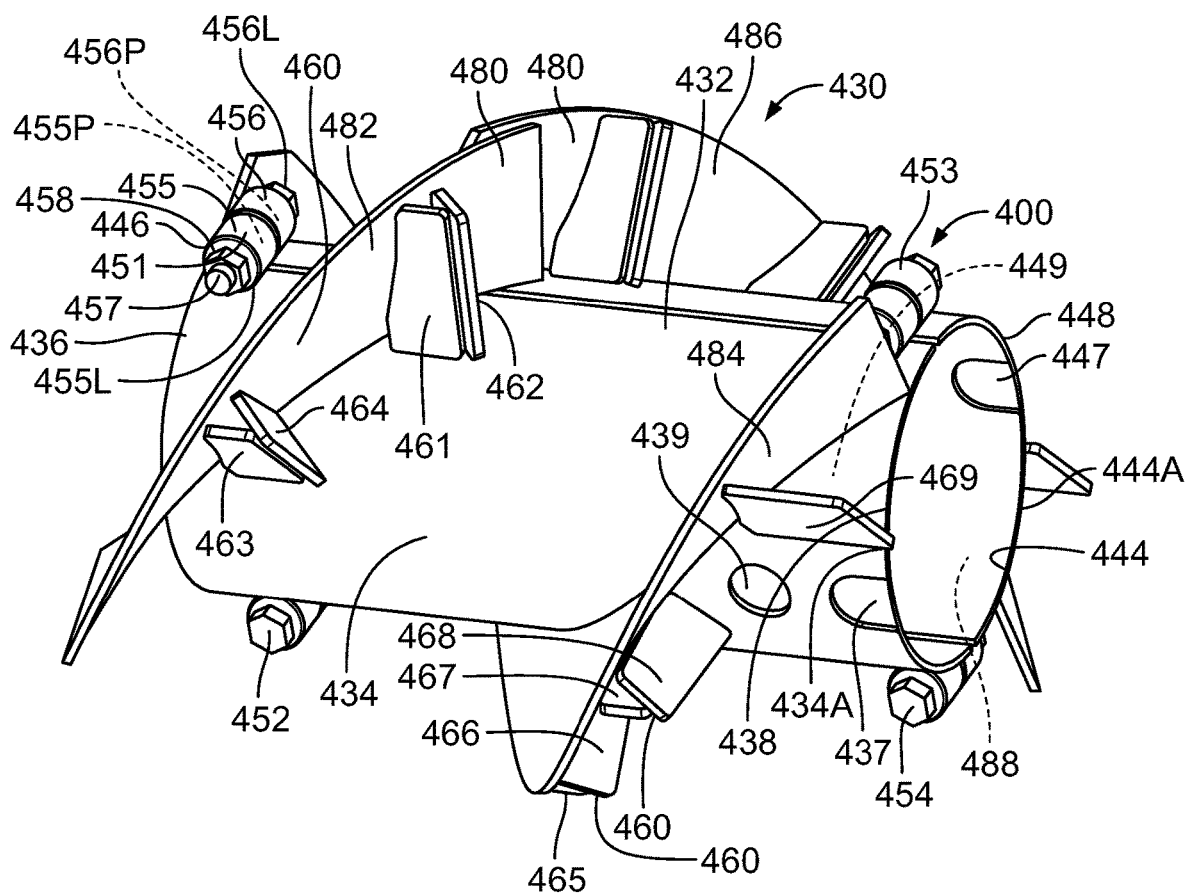
FIG. 4 is a perspective view of one example of an auger attachment set adapted for attachment to a drum of an auger of the header shown in FIG. 3.
Figure 5:
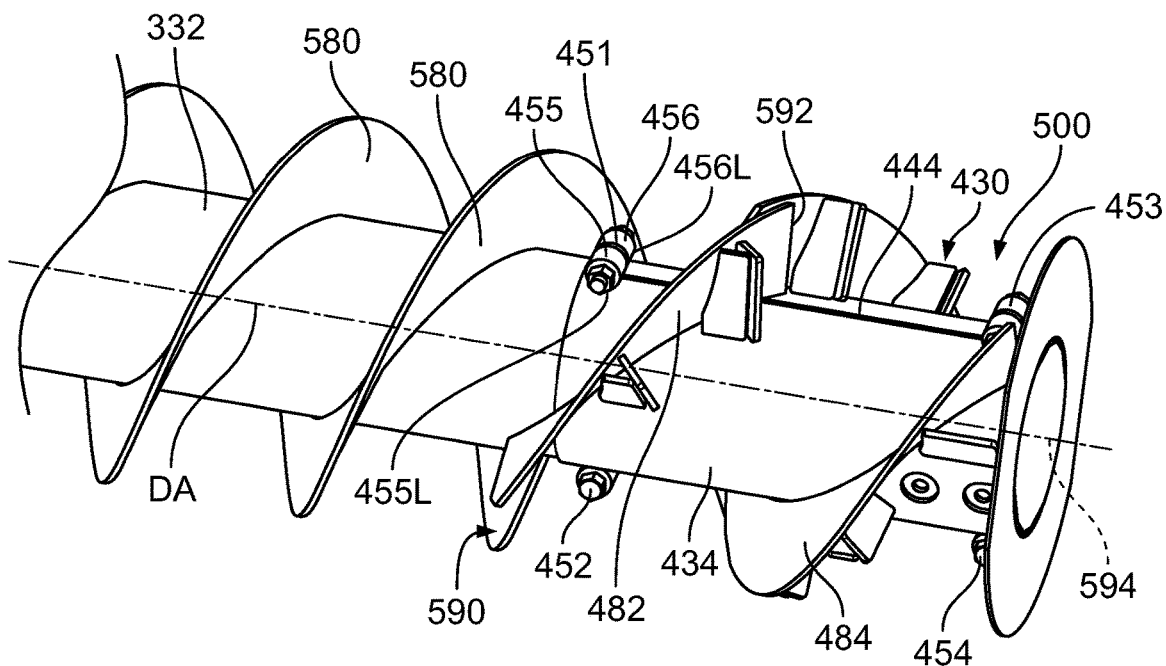
FIG. 5 is a perspective view of the auger attachment set shown in FIG. 4 attached to the drum of an auger.

Referring now to FIGS. 4 and 5, in accordance with one embodiment of the present disclosure, the auger 330 illustratively includes at least one auger attachment set 430. The at least one attachment set 430 is shown de-coupled from the drum 332 in FIG. 4 (e.g., in an uninstalled configuration 400) and coupled to the drum 332 in FIG. 5 (e.g., in an installed configuration 500). Of course, it should be appreciated that in some embodiments, rather than being included in the auger 330, the at least one auger attachment set 430 may be provided as a separate assembly from the auger 330. Furthermore, it should be appreciated that in some embodiments, the auger 330 may include multiple auger attachment sets 430 coupled to the drum 332. In such embodiments, the multiple auger attachment sets 430 may be substantially identical and coupled to the drum 332 in a substantially identical manner. For the sake of simplicity, the at least one auger attachment set 430 is described below with reference to FIGS. 4 and 5 as a single auger attachment set 430.

In the illustrative embodiment, the auger attachment set 430 includes a segmented shell 432 that has, or is otherwise formed from, a pair of shell halves 434, 444 each configured for direct attachment to the drum 332. When the shell halves 434, 444 are coupled to the drum 332 in the installed configuration 500, the shell halves 434, 444 cooperatively extend over the drum 332 and around the drum axis DA. Put another way, the shell halves 434, 444 cooperatively extend all the way around the drum axis DA to surround the drum 332 when coupled thereto in the installed configuration 500.

In other embodiments, however, it should be appreciated that the segmented shell 432 (and therefore the shell halves 434, 444) may be omitted from the auger attachment set 430 to reduce the size of the auger attachment set 430 and facilitate installation on the drum 332. In such embodiments, it should be appreciated that paddles 460 and flighting 480 of each auger attachment set 430 may contact and directly interface with the drum 332. Additionally, in such embodiments, it should be appreciated that clamps 450 may be omitted from each auger attachment set 430.

As described in greater detail below, in the illustrative embodiment, the auger attachment set 430 includes paddles 460 coupled to each of the shell halves 434, 444 that extend outwardly away from the shell halves 434, 444 and are structured to interact with crop material (e.g., cotton) passed through the header 120 to at least partially facilitate a uniform flow of crop material through the auger 330 along the desired flow path FP in use of the harvester 102. Additionally, as described in greater detail below, the auger attachment set 430 includes spiraled fighting 480 coupled to the paddles 460 that extends outwardly away from each of the shell halves 434, 444 and is structured to interact with crop material passed through the header 120 to at least partially facilitate a uniform flow of crop material through the auger 330 along the desired flow path FP in use of the harvester 102. It should be appreciated that in use of the auger attachment set 430, the paddles 460 and the flighting 480 cooperate to facilitate separation of debris, foreign matter, contaminants, and undesirable particulates from the crop material to allow crop material to pass along the flow path FP substantially free of such matter.

The illustrative shell halves 434, 444 are embodied as, or other include, arcuate components defining substantially semi-circular arcs 434A, 444A, respectively. As such, when the shell halves 434, 444 are coupled to the drum 332 in the installed configuration 500 shown in FIG. 5, each of the pair of shell halves 434, 444 extends about 180 degrees around the drum axis DA. The shell half 434 extends from an end 436 to an end 438 arranged opposite the end 436, and the shell half 444 extends from an end 446 to an end 448 arranged opposite the end 446.

In the illustrative embodiment, the shell halves 434, 444 are formed to include respective notches 437, 447 that extend through the respective ends 438, 448. The shell halves 434, 444 also include respective apertures 439, 449 that are arranged adjacent the notches 437, 447, respectively. In some embodiments, when the halves 434, 444 are coupled to the drum 332 in the installed configuration 500, the notches 437, 447 and the apertures 439, 449 may receive fasteners to secure the halves 434, 444 to the drum 332. In other embodiments, the notches 437, 447 and the apertures 439, 449 may be omitted from the shell halves 434, 444.

The illustrative shell halves 434, 444 have a metallic construction. Of course, it should be appreciated that in other embodiments, the shell halves 434, 444 may have another suitable construction. In such embodiments, the shell halves 434, 444 may be formed from polymeric or refractory materials such as acidic refractory materials, basic refractory materials, or neutral refractory materials, for example.

In the illustrative embodiment, the auger attachment set 430 includes clamps 450 to secure the pair of shell halves 434, 444 to one another around the drum axis DA in the installed configuration 500. The clamps 450 illustratively include four substantially identical clamps 451, 452, 453, 454. For the sake of simplicity, only one (i.e., the clamp 451) of the clamps 451, 452, 453, 454 is described in greater detail below. It should be appreciated that in other embodiments, the clamps 450 may include another suitable number of clamps. Furthermore, in other embodiments, it should be appreciated that the clamps 450 may have another suitable arrangement other than the arrangement described below.

The illustrative clamps 450 each have a metallic construction. Of course, it should be appreciated that in other embodiments, the clamps 450 may have another suitable construction. In such embodiments, the clamps 450 may be formed from polymeric or refractory materials such as acidic refractory materials, basic refractory materials, or neutral refractory materials, for example.

The illustrative clamp 451 includes clamp flanges 455, 456 that are each coupled to, or otherwise mounted on, one of the shell halves 434, 444. More specifically, the clamp flanges 455, 456 are coupled to, or otherwise mounted on, the respective shell halves 434, 444 at respective locations 455L, 456L that are substantially aligned along the drum axis DA (when the halves 434, 444 are coupled to the drum 332). Consequently, when the clamp flanges 455, 456 are aligned along the drum axis DA, the flanges 455, 456 are positioned to receive a fastener 457 through respective passageways 455P, 456P thereof to secure the halves 434, 444 to one another around the drum axis DA. A nut 458 extends around the fastener 457 and contacts one of the flanges 455, 456 to constrain the fastener 457 against movement out of the passageways 455P, 456P.

In the illustrative embodiment, the clamps 451, 452 of the auger attachment set 430 are circumferentially spaced from one another about 180 degrees around the drum axis DA when the halves 434, 444 are coupled to the drum 332 in the installed configuration 500. The clamps 453, 454 are illustratively spaced from one another about 180 degrees around the drum axis DA when the halves 434, 444 are coupled to the drum 332 in the installed configuration 500. The clamps 451, 452 are arranged adjacent the respective ends 436, 446, whereas the clamps 453, 454 are arranged adjacent the respective ends 438, 448.

The illustrative paddles 460 of the auger attachment set 430 are coupled to, and arranged on, each of the shell halves 434, 444 in similar fashion. Additionally, the same number of paddles 460 are coupled to, and arranged on, each of the shell halves 434, 444. Accordingly, for the sake of simplicity, the paddles 460 are described below with reference only to the shell half 434.

Each of the paddles 460 is illustratively embodied as, or otherwise includes, a plate having a metallic construction. Of course, it should be appreciated that in other embodiments, each of the paddles 460 may be embodied as, or otherwise include, a plate having another suitable construction. In such embodiments, the paddles 460 may each be formed from polymeric or refractory materials such as acidic refractory materials, basic refractory materials, or neutral refractory materials, for example.

The illustrative paddles 460 include paddles 461, 462, 463, 464, 465, 466, 467, 468, 469 contacting the shell half 434 and extending outwardly therefrom as best seen in FIG. 4. In the illustrative embodiment, the following pairs of paddles 460 are arranged in close proximity to one another to form a V-shape: (i) paddles 461, 462, (ii) paddles 463, 464, (iii) paddles 465, 466, and (iv) paddles 467, 468. The paddle pair 461, 462 and the paddle pair 463, 464 are circumferentially spaced from one another about the drum axis DA. The paddle pair 465, 466 and the paddle pair 467, 468 are circumferentially spaced from one another about the drum axis DA. The paddle pairs (i) 461, 462 and (ii) 463, 464 are spaced from the paddle pairs (iii) 465, 466 and (iv) 467, 468 along the drum axis DA.

In the illustrative embodiment, the spiraled flighting 480 of the auger attachment set 430 is coupled to each of the shell halves 434, 444 and extends outwardly away therefrom. When the shell halves 434, 444 are coupled to the drum 332 in the installed configuration 500, the spiraled fighting 480 (i.e., multiple flights of the flighting 480 discussed below) interface with drum flighting 580 extending outwardly away from the drum 332 to form a substantially continuous spiraled flighting arrangement 590 as shown in FIG. 5. Said another way, one or more auger attachment sets 430 are configured for attachment to the drum 332 to form a substantially continuous corkscrew, helical, and/or spiraled flighting arrangement 590 lengthwise along the drum axis DA as best seen in FIG. 5.

Each flight of the illustrative fighting 480 has a metallic construction. Of course, it should be appreciated that in other embodiments, each flight of the flighting 480 may have another suitable construction. In such embodiments, each flight of the flighting 480 may be formed from polymeric or refractory materials such as acidic refractory materials, basic refractory materials, or neutral refractory materials, for example.

The flighting 480 coupled to each of the halves 434, 444 contacts the paddles 460 that are coupled to each of the halves 434, 444 as shown in FIGS. 4 and 5. The flighting 480 includes a flight 482 that contacts the paddle pairs (i) 461, 462 and (ii) 463, 464 and a flight 484 that contacts the paddle pairs (iii) 465, 466 and (iv) 467, 468 and the paddle 469. The flights 482, 484 are spaced from one another along the drum axis DA. In addition, the flighting 480 includes flights 486 and 488 that are spaced from one another along the drum axis DA and contact the paddles 460 coupled to, and extending outwardly away from, the shell half 444.

In the illustrative embodiment, the flights 482, 486 interface with one another to form a substantially continuous spiraled flighting segment 592 of the flighting arrangement 590. Additionally, in the illustrative embodiment, the flights 484, 488 interface with one another to form a substantially continuous spiraled flighting segment 594 of the flighting arrangement 590. It should be appreciated that, compared to other configurations, continuity of the spiraled fighting arrangement 590 lengthwise along the drum axis DA may correspond to, or otherwise be associated with, increased uniformity of crop material flow through the header 120 in use of the harvester 102.

Figure 6:
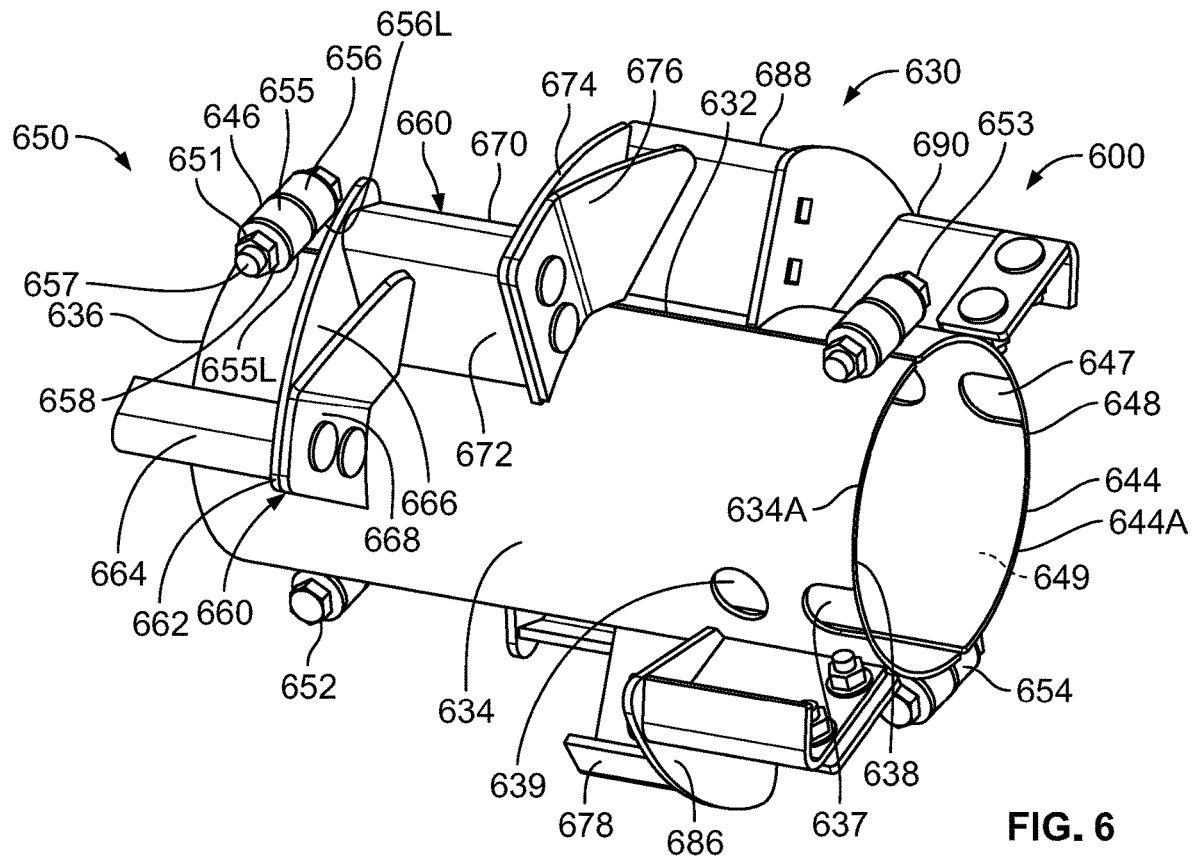
FIG. 6 is a perspective view of another example of an auger attachment set adapted for attachment to the drum of the auger of the header shown in FIG. 3.
Figure 7:
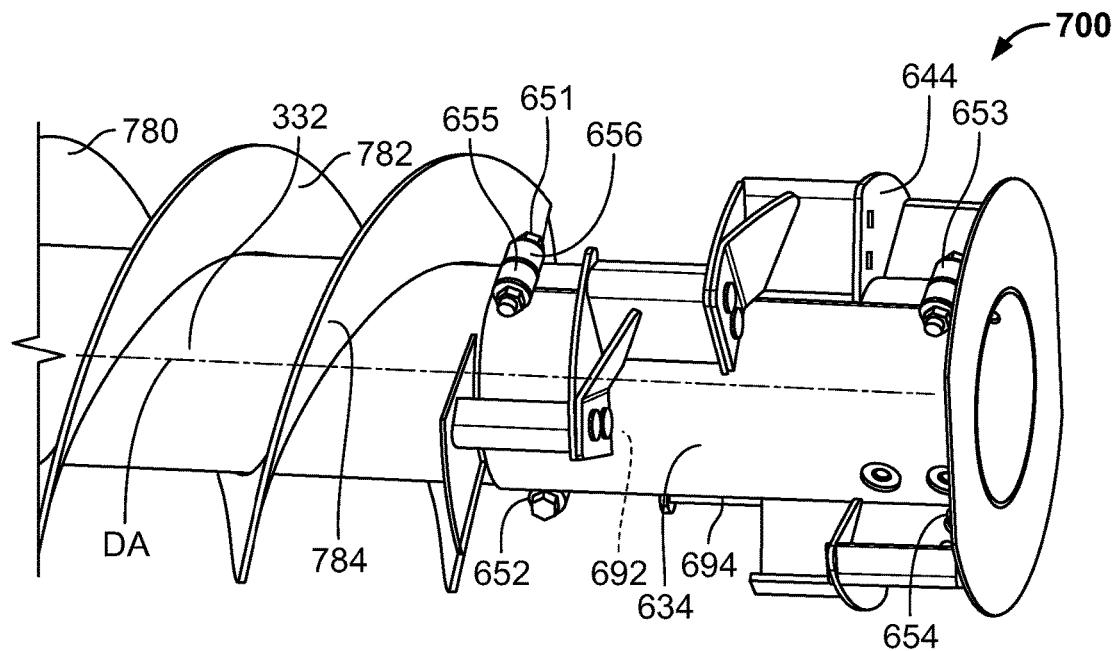
FIG. 7 is a perspective view of the auger attachment set shown in FIG. 6 attached to the drum of an auger.

Referring now to FIGS. 6 and 7, in accordance with another embodiment of the present disclosure, the auger 330 illustratively includes at least one auger attachment set 630. The at least one attachment set 630 is shown de-coupled from the drum 332 in FIG. 6 (e.g., in an uninstalled configuration 600) and coupled to the drum 332 in FIG. 7 (e.g., in an installed configuration 700). Of course, it should be appreciated that in some embodiments, rather than being included in the auger 330, the at least one auger attachment set 630 may be provided as a separate assembly from the auger 330. Furthermore, it should be appreciated that in some embodiments, the auger 330 may include multiple auger attachment sets 630 coupled to the drum 332. In such embodiments, the multiple auger attachment sets 630 may be substantially identical and coupled to the drum 332 in a substantially identical manner. For the sake of simplicity, the at least one auger attachment set 630 is described below with reference to FIGS. 6 and 7 as a single auger attachment set 630.

In the illustrative embodiment, the auger attachment set 630 includes a segmented shell 632 that has, or is otherwise formed from, a pair of shell halves 634, 644 each configured for direct attachment to the drum 332. When the shell halves 634, 644 are coupled to the drum 332 in the installed configuration 700, the shell halves 634, 644 cooperatively extend over the drum 332 and around the drum axis DA. Put another way, the shell halves 634, 644 cooperatively extend all the way around the drum axis DA to surround the drum 632 when coupled thereto in the installed configuration 700.

In other embodiments, however, it should be appreciated that the segmented shell 632 (and therefore the shell halves 634, 644) may be omitted from the auger attachment set 630 to reduce the size of the auger attachment set 630 and facilitate installation on the drum 332. In such embodiments, it should be appreciated that paddles 660 of each auger attachment set 630 may contact and directly interface with the drum 332. Additionally, in such embodiments, it should be appreciated that clamps 650 may be omitted from each auger attachment set 630.

As described in greater detail below, in the illustrative embodiment, the auger attachment set 630 includes paddles 660 coupled to each of the shell halves 634, 644 that extend outwardly away from the shell halves 634, 644 and are structured to interact with crop material (e.g., cotton) passed through the header 120 to at least partially facilitate a uniform flow of crop material through the auger 330 along the desired flow path FP in use of the harvester 102. It should be appreciated that in addition to at least partially facilitating a uniform flow of crop material along the desired flow path FP, the paddles 660 may at least partially facilitate separation of debris, foreign matter, contaminants, and undesirable particulates from the crop material to allow crop material to pass along the flow path FP substantially free of such matter.

The illustrative shell halves 634, 644 are embodied as, or other include, arcuate components defining substantially semi-circular arcs 634A, 644A, respectively. As such, when the shell halves 634, 644 are coupled to the drum 332 in the installed configuration 700 shown in FIG. 7, each of the pair of shell halves 634, 644 extends about 180 degrees around the drum axis DA. The shell half 634 extends from an end 636 to an end 638 arranged opposite the end 636, and the shell half 644 extends from an end 646 to an end 648 arranged opposite the end 646.

In the illustrative embodiment, the shell halves 634, 644 are formed to include respective notches 637, 647 that extend through the respective ends 638, 648. The shell halves 634, 644 also include respective apertures 639, 649 that are arranged adjacent the notches 637, 647, respectively. In some embodiments, when the halves 634, 644 are coupled to the drum 332 in the installed configuration 700, the notches 637, 647 and the apertures 639, 649 may receive fasteners to secure the halves 634, 644 to the drum 332. In other embodiments, the notches 637, 647 and the apertures 639, 649 may be omitted from the shell halves 634, 644.

The illustrative shell halves 634, 644 have a metallic construction. Of course, it should be appreciated that in other embodiments, the shell halves 634, 644 may have another suitable construction. In such embodiments, the shell halves 634, 644 may be formed from polymeric or refractory materials such as acidic refractory materials, basic refractory materials, or neutral refractory materials, for example.

In the illustrative embodiment, the auger attachment set 630 includes clamps 650 to secure the pair of shell halves 634, 644 to one another around the drum axis DA in the installed configuration 700. The clamps 650 illustratively include four substantially identical clamps 651, 652, 653, 654. For the sake of simplicity, only one (i.e., the clamp 651) of the clamps 651, 652, 653, 654 is described in greater detail below. It should be appreciated that in other embodiments, the clamps 650 may include another suitable number of clamps. Furthermore, in other embodiments, it should be appreciated that the clamps 650 may have another suitable arrangement other than the arrangement described below.

The illustrative clamps 650 each have a metallic construction. Of course, it should be appreciated that in other embodiments, the clamps 650 may have another suitable construction. In such embodiments, the clamps 650 may be formed from polymeric or refractory materials such as acidic refractory materials, basic refractory materials, or neutral refractory materials, for example.

The illustrative clamp 651 includes clamp flanges 655, 656 that are each coupled to, or otherwise mounted on, one of the shell halves 634, 644. More specifically, the clamp flanges 655, 656 are coupled to, or otherwise mounted on, the respective shell halves 634, 644 at respective locations 655L, 656L that are substantially aligned along the drum axis DA (when the halves 634, 644 are coupled to the drum 332). Consequently, when the clamp flanges 655, 656 are aligned along the drum axis DA, the flanges 655, 656 are positioned to receive a fastener 657 through respective passageways 655P, 656P thereof to secure the halves 634, 644 to one another around the drum axis DA. A nut 658 extends around the fastener 657 and contacts one of the flanges 655, 656 to constrain the fastener 657 against movement out of the passageways 655P, 656P.

In the illustrative embodiment, the clamps 651, 652 of the auger attachment set 630 are circumferentially spaced from one another about 180 degrees around the drum axis DA when the halves 634, 644 are coupled to the drum 332 in the installed configuration 700. The clamps 653, 654 are illustratively spaced from one another about 180 degrees around the drum axis DA when the halves 634, 644 are coupled to the drum 332 in the installed configuration 700. The clamps 651, 652 are arranged adjacent the respective ends 636, 646, whereas the clamps 653, 654 are arranged adjacent the respective ends 638, 648.

The illustrative paddles 660 of the auger attachment set 630 are coupled to, and arranged on, each of the shell halves 634, 644 in similar fashion. Additionally, in the illustrative embodiment, four paddles 660 are coupled to, and arranged on, each of the shell halves 634, 644. Accordingly, for the sake of simplicity, the paddles 660 are described below with reference only to the shell half 634.

The illustrative paddles 660 include four paddles 662, 670, 678, 686 that contact, and extend outwardly away from, the shell half 634. Each of the paddles 662, 670, 678, 686 are substantially similar to one other. Accordingly, for the sake of simplicity, only the paddles 662, 670 are described in greater detail below. That being said, the paddles 662, 670, 678, 686 are at least partially spaced from one another circumferentially about the drum axis DA, and the paddles 662, 670, 678, 686 are at least partially spaced from one another along the drum axis DA.

The illustrative paddles 662, 670 are located circumferentially adjacent one another about the drum axis DA as shown in FIGS. 6 and 7. The paddle 662 includes a block projection 664, a plate 666 coupled to the block projection 664 that extends partway around the drum axis DA, and a flap 668 coupled to the plate 666. Similarly, the paddle 670 includes a block projection 672, a plate 674 coupled to the block projection 672 that extends partway around the drum axis DA, and a flap 676 coupled to the plate 674.

In the illustrative embodiment, the block projections (e.g., the block projections 664, 672) of the paddles 660 each have a metallic construction. Additionally, the plates (e.g., the plates 666, 674) of the illustrative paddles 660 each have a metallic construction. Finally, the flaps (e.g., the flaps 668, 676) of the illustrative paddles 660 each have a polymeric construction. In other embodiments, however, it should be appreciated that the block projections, the plates, and the flaps of the paddles 660 may have another suitable construction. For example, in some embodiments, the block projections and the plates of the paddles 660 may be formed from polymeric or refractory materials, and the flaps of the paddles 660 may be formed from metallic or refractory materials.

In the illustrative arrangement of the paddles 660, the plate 666 of the paddle 662 contacts the block projection 672 of the paddle 670 and thereby connects the paddles 662, 670 to one another. Additionally, the flap 668 of the paddle 662 extends toward the block projection 672 of the paddle 670. It should be appreciated that any two paddles 660 located circumferentially adjacent one another about the drum axis DA may have the same arrangement relative to one another as discussed above with regards to the paddles 662, 670.

In the illustrative embodiment, the paddles 662, 670 contacting the shell half 634 and paddles 688, 690 of the paddles 660 contacting the shell half 644 may be said to be circumferentially staggered about the drum axis DA when the shell halves 634, 644 are coupled to the drum 332 in the installed configuration 700. In addition, the paddles 678, 686 contacting the shell half 634 and paddles 692, 694 of the paddles 660 contacting the shell half 644 may be said to be circumferentially staggered about the drum axis DA when the shell halves 634, 644 are coupled to the drum 332 in the installed configuration 700.

In the illustrative installed configuration 700 of the auger attachment set 630, the paddle 662 (i.e., the block projection 664 thereof) interfaces with a flight 782 of drum fighting 780 extending outwardly away from the drum 332. Additionally, in the illustrative installed configuration 700 of the set 630, the paddle 694 (i.e., a block projection thereof) interfaces with a flight 784 of drum flighting 780.

Figure 8:
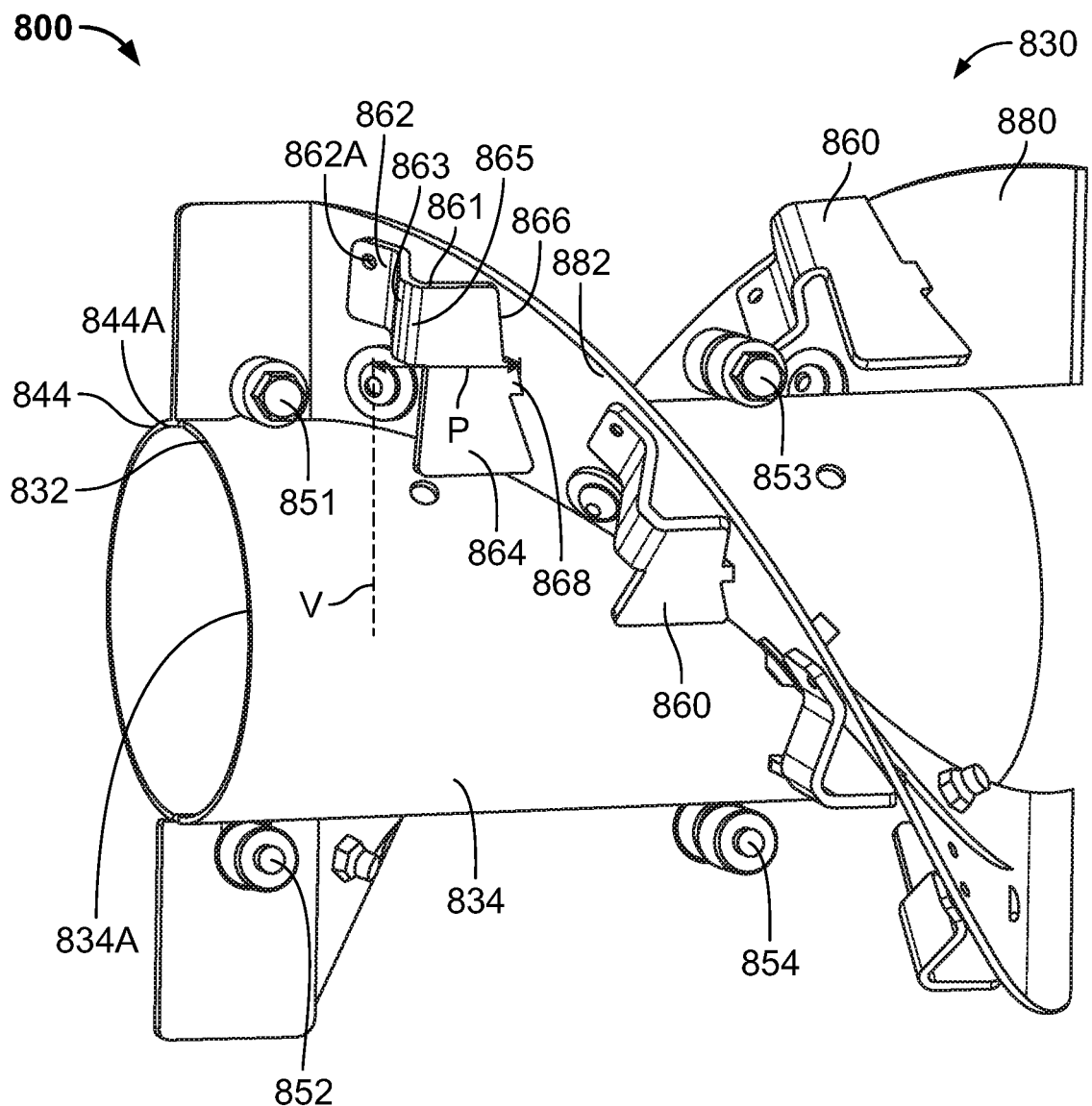
FIG. 8 is a perspective view of yet another example of an auger attachment set adapted for attachment to the drum of the auger of the header shown in FIG. 3.

Referring now to FIG. 8, in accordance with one embodiment of the present disclosure, the auger 330 illustratively includes at least one auger attachment set 830. The at least one attachment set 830 is shown de-coupled from the drum 332 in FIG. 8 (e.g., in an uninstalled configuration 800). Of course, it should be appreciated that in some embodiments, rather than being included in the auger 330, the at least one auger attachment set 830 may be provided as a separate assembly from the auger 330. Furthermore, it should be appreciated that in some embodiments, the auger 330 may include multiple auger attachment sets 830 coupled to the drum 332. In such embodiments, the multiple auger attachment sets 830 may be substantially identical and coupled to the drum 332 in a substantially identical manner. For the sake of simplicity, the at least one auger attachment set 830 is described below with reference to FIG. 8 as a single auger attachment set 830.

In the illustrative embodiment, the auger attachment set 830 includes a segmented shell 832 that has, or is otherwise formed from, a pair of shell halves 834, 844 each configured for direct attachment to the drum 332. When the shell halves 834, 844 are coupled to the drum 332 in an installed configuration (not shown), the shell halves 834, 844 cooperatively extend over the drum 332 and around the drum axis (e.g., the drum axis DA). Put another way, the shell halves 834, 844 cooperatively extend all the way around the drum axis to surround the drum 332 when coupled thereto in the installed configuration.

In other embodiments, however, it should be appreciated that the segmented shell 832 (and therefore the shell halves 834, 844) may be omitted from the auger attachment set 830 to reduce the size of the auger attachment set 830 and facilitate installation on the drum 332. In such embodiments, it should be appreciated that paddles 860 and flighting 880 of each auger attachment set 830 may contact and directly interface with the drum 332. Additionally, in such embodiments, it should be appreciated that clamps 850 may be omitted from each auger attachment set 830.

As described in greater detail below, in the illustrative embodiment, the auger attachment set 830 includes paddles 860 coupled to each of the shell halves 834, 844 that extend outwardly away from the shell halves 834, 844 and are structured to interact with crop material (e.g., cotton) passed through the header 120 to at least partially facilitate a uniform flow of crop material through the auger 330 along the desired flow path FP in use of the harvester 102. Additionally, as described in greater detail below, the auger attachment set 830 includes spiraled fighting 880 coupled to the paddles 860 that extends outwardly away from each of the shell halves 834, 844 and is structured to interact with crop material passed through the header 120 to at least partially facilitate a uniform flow of crop material through the auger 330 along the desired flow path FP in use of the harvester 102. It should be appreciated that in use of the auger attachment set 830, the paddles 860 and the flighting 880 cooperate to facilitate separation of debris, foreign matter, contaminants, and undesirable particulates from the crop material to allow crop material to pass along the flow path FP substantially free of such matter.

The illustrative shell halves 834, 844 are embodied as, or other include, arcuate components defining substantially semi-circular arcs 834A, 844A, respectively. As such, when the shell halves 834, 844 are coupled to the drum 332 in the installed configuration, each of the pair of shell halves 834, 844 extends about 180 degrees around the drum axis.

The illustrative shell halves 834, 844 have a metallic construction. Of course, it should be appreciated that in other embodiments, the shell halves 834, 844 may have another suitable construction. In such embodiments, the shell halves 834, 844 may be formed from polymeric or refractory materials such as acidic refractory materials, basic refractory materials, or neutral refractory materials, for example.

In the illustrative embodiment, the auger attachment set 830 includes clamps 850 to secure the pair of shell halves 834, 844 to one another around the drum axis in the installed configuration. The clamps 850 illustratively include four substantially identical clamps 851, 852, 853, 854. It should be appreciated that in other embodiments, the clamps 850 may include another suitable number of clamps. Furthermore, in other embodiments, it should be appreciated that the clamps 850 may have another suitable arrangement other than the arrangement described below.

The illustrative clamps 850 each have a metallic construction. Of course, it should be appreciated that in other embodiments, the clamps 850 may have another suitable construction. In such embodiments, the clamps 850 may be formed from polymeric or refractory materials such as acidic refractory materials, basic refractory materials, or neutral refractory materials, for example.

In the illustrative embodiment, the clamps 851, 852 of the auger attachment set 830 are circumferentially spaced from one another about 180 degrees around the drum axis when the halves 834, 844 are coupled to the drum 332 in the installed configuration. The clamps 853, 854 are illustratively spaced from one another about 180 degrees around the drum axis when the halves 834, 844 are coupled to the drum 332 in the installed configuration.

The illustrative paddles 860 of the auger attachment set 830 are coupled to, and arranged on, each of the shell halves 834, 844 in similar fashion. Additionally, the same number of paddles 860 are coupled to, and arranged on, each of the shell halves 834, 844. Accordingly, for the sake of simplicity, the paddles 860 are described below with reference only to the shell half 834.

Each of the paddles 860 is illustratively embodied as, or otherwise includes, a component having a metallic construction. Of course, it should be appreciated that in other embodiments, each of the paddles 860 may be embodied as, or otherwise include, a component having another suitable construction. In such embodiments, the paddles 860 may each be formed from polymeric or refractory materials such as acidic refractory materials, basic refractory materials, or neutral refractory materials, for example.

Using paddle 861 as an example, the illustrative paddle 861 (and each of the paddles 860) includes a flange portion 862. The flange portion 862 contacts at least one flight (e.g., the flight 882 of fighting 880) and is positionable relative to the least one flight to adjust a pitch P of the paddle 861. Although the pitch P is defined relative to the vertical V, it should be appreciated that the pitch P may be defined relative to another suitable reference. In any case, the flange portion 862 is shaped to interface with the at least one flight so that the flange portion 862 extends substantially parallel to, and is substantially flush with, the at least one flight. In the illustrative embodiment, the flange portion 862 is formed to include an aperture 862A that is sized to receive a fastener to secure the flange portion 862 (and thus the paddle 861) to the at least one flight so that the paddle 861 has a predetermined pitch P. Of course, it should be appreciated that the predetermined pitch P and/or orientation of the paddle 861 may correspond to, or otherwise be associated with, a uniform flow of crop material through the auger 330 along the desired flow path FP in use of the harvester 102.

The illustrative paddle 861 includes a body portion 864 and a bridge portion 863 that interconnects the body portion 864 to the flange portion 862. The bridge portion 863 illustratively extends outwardly away from the flange portion 862 and the at least one flight to the body portion 864. The body portion 864 includes an end 865 that is arranged adjacent the bridge portion 863 and an end 866 that is arranged opposite the end 865 and positioned in close proximity to the at least one flight. The body portion 864 extends toward and confronts the at least one flight. In the illustrative embodiment, the bridge portion 863 and the body portion 864 cooperate to define a generally V-shaped profile of the paddle 861.

In the illustrative embodiment, the paddle 861 includes a tab 868 that extends outwardly from the end 866 toward the at least one flight. Additionally, in the illustrative embodiment, the body portion 864 extends over substantially the entire radial extent (i.e., in an outward radial direction away from the drum axis) of the at least one flight, whereas the flange portion 862 and the bridge portion 863 do not extend over substantially the entire radial extent of the at least one flight.

In the illustrative embodiment, the spiraled flighting 880 of the auger attachment set 830 is coupled to each of the shell halves 834, 844 and extends outwardly away therefrom. When the shell halves 834, 844 are coupled to the drum 332 in the installed configuration, the spiraled fighting 880 (i.e., multiple flights of the flighting 880) may interface with drum fighting extending outwardly away from the drum 332 to form a substantially continuous spiraled fighting arrangement. Said another way, one or more auger attachment sets 830 are configured for attachment to the drum 332 to form a substantially continuous corkscrew, helical, and/or spiraled fighting arrangement lengthwise along the drum axis.

Each flight of the illustrative fighting 880 has a metallic construction. Of course, it should be appreciated that in other embodiments, each flight of the flighting 880 may have another suitable construction. In such embodiments, each flight of the flighting 880 may be formed from polymeric or refractory materials such as acidic refractory materials, basic refractory materials, or neutral refractory materials, for example.

Figure 9:
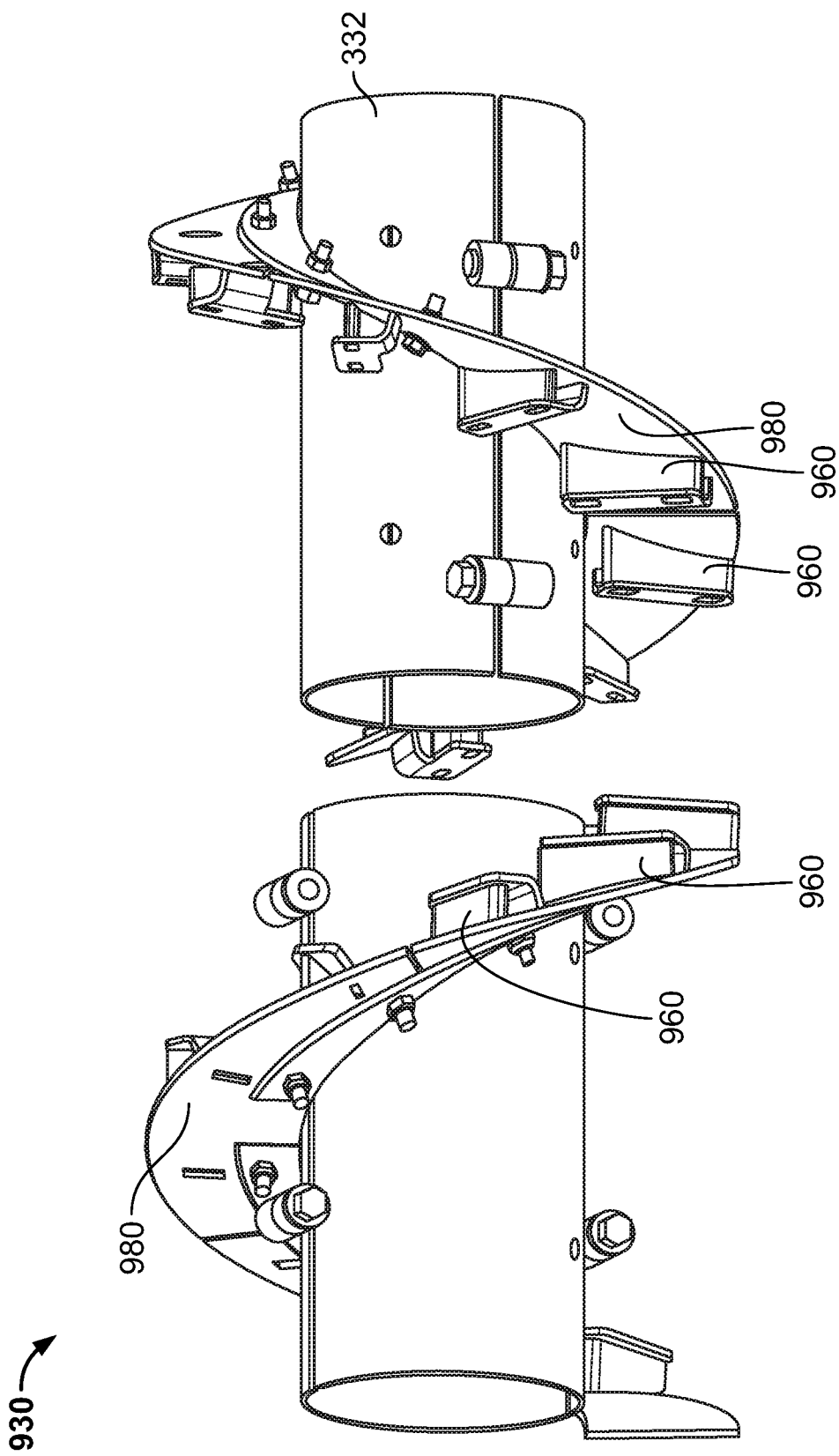
FIG. 9 is a perspective view of yet another example still of an auger attachment set adapted for attachment to the drum of the auger of the header shown in FIG. 3.

Referring now to FIG. 9, in accordance with one embodiment of the present disclosure, the auger 330 illustratively includes at least one auger attachment set 930. The auger attachment set 930 includes paddles 960 and flighting 980 that are substantially similar to the corresponding features depicted in the other Figures. In the illustrative embodiment, the paddles 960 and the flighting 980 are directly attached to (e.g., welded) the drum 332 without the use of a segmented clam shell.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A machine comprising:
   a chassis; and
   a header coupled to the chassis and positioned to remove crop material from the ground, wherein the header includes an auger structured to interact with crop material passed through the header in use of the machine, wherein the auger has a drum configured for rotation about a drum axis and at least one auger attachment set coupled to the drum, wherein the at least one auger attachment set includes paddles that extend outwardly away from the drum over a first distance and are structured to interact with crop material passed through the header to at least partially facilitate a uniform flow of crop material through the auger in use of the machine, wherein the at least one auger attachment set includes flighting that extends outwardly away from the drum over a second distance and is structured to interact with crop material passed through the header to facilitate, in cooperation with the paddles, the uniform flow of crop material through the auger in use of the machine, wherein the second distance is equal to, or greater than, the first distance, wherein the flighting contacts the paddles coupled to the drum, wherein the paddles coupled to the drum include a first pair of paddles arranged in close proximity to one another and a second pair of paddles arranged in close proximity to one another, and wherein the first and second pairs of paddles are circumferentially spaced from one another about the drum axis.

2. The machine of claim 1, wherein the at least one auger attachment set includes a pair of shell halves that cooperatively extend over the drum, wherein each of the pair of shell halves extends about 180 degrees around the drum axis, and wherein the at least one auger attachment set includes clamps to secure the pair of shell halves to one another around the drum axis.

3. The machine of claim 2, wherein the clamps include a first pair of clamps circumferentially spaced from one another about 180 degrees around the drum axis and a second pair of clamps circumferentially spaced from one another about 180 degrees around the drum axis.

4. The machine of claim 1, wherein each of the paddles includes a flange portion that contacts at least one flight of the flighting and is positionable relative to the at least one flight to adjust a pitch of each paddle.

5. The machine of claim 4, wherein each of the paddles includes a bridge portion that interconnects the flange portion to a body portion of each paddle, and wherein the bridge portion and the body portion cooperate to define a generally V-shaped profile of each paddle.

6. The machine of claim 5, wherein the body portion of each paddle includes a first end arranged adjacent the bridge portion and spaced from the at least one flight and a second end arranged opposite the first end and positioned in close proximity to the at least one flight.

7. The machine of claim 1, wherein multiple paddles coupled to the drum each include a block projection, a plate coupled to the block projection that extends partway around the drum axis, and a flap coupled to the plate.

8. The machine of claim 7, wherein the plate of one paddle contacts the block projection of another circumferentially adjacent paddle, and wherein the flap of the one paddle extends toward the block projection of the another circumferentially adjacent paddle.

9. The machine of claim 1, wherein the first distance is equal to the second distance.

10. A header for a machine, the header comprising:
    an auger structured to interact with crop material removed from the ground and passed through the header in use thereof, wherein the auger has a drum configured for rotation about a drum axis; and
    at least one auger attachment set coupled to the drum, wherein the at least one auger attachment set includes paddles coupled to the drum that extend outwardly away therefrom and spiraled flighting in contact with the paddles that extends outwardly away from the drum, wherein the paddles and the spiraled flighting are structured to interact with crop material passed through the header to facilitate a uniform flow of crop material through the auger in use of the header, wherein the paddles include a first pair of paddles coupled to the flighting in close proximity to one another and a second pair of paddles coupled to the flighting in close proximity to one another, and wherein the first and second pairs of paddles are circumferentially spaced from one another about the drum axis.

11. The header of claim 10, wherein the spiraled flighting includes a first flight coupled to the first and second pairs of paddles and a second flight coupled to a third pair of paddles arranged in close proximity to one another and to a fourth pair of paddles arranged in close proximity to one another, and wherein the first and second flights interface with one another to form a substantially continuous spiraled flighting segment.

12. The header of claim 10, wherein each of the paddles includes a flange portion that contacts at least one flight of the spiraled flighting, a body portion that extends toward and confronts the at least one flight, and a bridge portion that interconnects the flange portion to the body portion.

13. The header of claim 12, wherein the bridge portion and the body portion of each paddle cooperate to define a generally V-shaped profile of each paddle.

14. The header of claim 10, wherein the paddles extend outwardly away from the drum over a first distance, and wherein the spiraled flighting extends outwardly away from the drum over a second distance that is greater than, or equal to, the first distance.

15. A header for a machine, the header comprising:
an auger structured to interact with crop material removed from the ground and passed through the header in use thereof, wherein the auger has a drum configured for rotation about a drum axis; and
at least one auger attachment set coupled to the drum, wherein the at least one auger attachment set includes paddles coupled to the drum that extend outwardly away therefrom and are structured to interact with crop material passed through the header to at least partially facilitate a uniform flow of crop material through the auger in use of the header, wherein the at least one auger attachment set includes flighting that extends outwardly away from the drum and is structured to interact with crop material passed through the header to, in cooperation with the paddles, facilitate the uniform flow of crop material through the auger in use of the machine, and wherein the paddles include at least one pair of paddles that are coupled to the flighting in close proximity to one another such that the at least one pair of paddles converge toward one another to define a generally V-shaped profile of the at least one pair of paddles.

16. The header of claim 15, wherein the at least one auger attachment set includes at least four paddles coupled to the drum, and wherein multiple paddles each include a block projection, a plate coupled to the block projection that extends partway around the drum axis, and a flap coupled to the plate.

17. The header of claim 15, wherein each of the paddles includes a flange portion that contacts at least one flight of the flighting, a body portion that extends toward and confronts the at least one flight, and a bridge portion that interconnects the flange portion to the body portion, and wherein the bridge portion and the body portion of each paddle cooperate to define a generally V-shaped profile of each paddle.

18. The header of claim 15, wherein the paddles extend outwardly away from the drum over a first distance, and wherein the flighting extends outwardly away from the drum over a second distance that is greater than, or equal to, the first distance.

* * * * *